United States Patent [19]

Okazaki et al.

[11] Patent Number: 5,151,263

[45] Date of Patent: Sep. 29, 1992

[54] PROCESS FOR THE CATALYIC DECOMPOSITION OF CHLOROFLUORO-ALKANES

[75] Inventors: Susumu Okazaki; Akito Kurosaki, both of Mito City, Japan

[73] Assignee: Dupont-Mitsui Fluorochemicals Co., Ltd., Tokyo, Japan

[21] Appl. No.: 557,478

[22] Filed: Jul. 25, 1990

[30] Foreign Application Priority Data

Aug. 5, 1989 [JP] Japan ................... 1-202297

[51] Int. Cl.$^5$ ................................ C01B 9/00
[52] U.S. Cl. ..................... 423/659; 423/481; 423/DIG. 20; 570/227; 570/228; 570/229; 588/208
[58] Field of Search ............... 423/239, 487, DIG. 20, 423/659; 570/227, 228, 229, 263

[56] References Cited

U.S. PATENT DOCUMENTS

| | | | |
|---|---|---|---|
| 4,018,879 | 4/1977 | Winnen | 423/481 |
| 4,031,149 | 6/1977 | Eden | 423/481 |
| 4,849,561 | 7/1989 | Franklin | 570/220 |
| 4,851,597 | 7/1989 | Felix et al. | 570/227 |
| 5,080,778 | 1/1992 | Lambert | 208/111 |
| 5,096,871 | 3/1992 | Lever et al. | 502/411 |

FOREIGN PATENT DOCUMENTS

| | | | |
|---|---|---|---|
| 6391128 | 4/1988 | Japan | 423/240 |
| 2159137 | 11/1985 | United Kingdom | 423/481 |

OTHER PUBLICATIONS

Kirk Authmire: Encyclopedia f Chemical Technology, vol. 2, pp. 219, 225–226 and 233.

Primary Examiner—Gary P. Straub
Assistant Examiner—Timothy C. Vanoy
Attorney, Agent, or Firm—Webb, Burden, Ziesenheim & Webb

[57] ABSTRACT

A process for the catalytic decomposition of chlorofluoro-alkanes commonly named as "flons" into harmless substances against destructing ozone layer of the stratosphere by using the catalyst comprising alumina or alumina -silica complexed oxide, wherein the range of Al/(Al+Si) atomic ratio is 1.0 to 0.5, in the presence of steam at the temperature of 350° to 1.000° C.

3 Claims, 4 Drawing Sheets

RELATION BETWEEN Al CONTENT AND CONVERSION RATE

PROCESS FOR THE CATALYIC DECOMPOSITION OF CHLOROFLUORO-ALKANES

BACKGROUND OF THE INVENTION

The present invention relates to a process for the catalytic decomposition of chlorofluoro-alkanes commonly named as "flons". More particularly this invention relates to a process for decomposing chlorofluoro-alkanes to non hazard compounds by using the catalysts in the presence of steam.

Chlorofluoro-alkanes, wherein the hydrogens of hydrocarbon are wholly or partially substituted with fluorines and chlorines (hereinafter may be abbreviated as flons) are stable both in chemical and thermal properties, non-toxic and has no smell. For that reason, have been widely used as the most safe substances for refrigerant, foaming agent, solvent and so on.

However, recently among these flons, particularly chlorofluorocarbons(CFC), wherein all of the hydrogen atoms are substituted with fluorines and chlorines, have been found to be decomposed in the ozon layer of the stratosphere and to have high possibility of destructing the ozon layer. It has been determined that the production of such flons should be gradually reduced by substituting the one which does not destruct the ozon layer for them.

Accordingly, in addition to the development of such substitute, the development of the process of decomposing the presently used flons into the substances which are no fear of destructing the ozone layer before giving off the flons into air has been desired.

However, such flons are extremely stable compounds, poor in the reactivity and are considered to be difficult to act on the decomposition reaction. Plasma method of decomposition at very high temperature and so on are known.

On the other hand, the process of the decomposition comprising in contacting the flons in addition to steam and air with zeolite catalyst at 400° to 700° C. has recently reported, but presently only a few of the reports concerning the study of catalytic decomposition reaction have been published.

However, as a method of treating the exhausted gases such a large scaled and high cost method as plasma method is difficult in applications, so it is almost impossible to really use it for the solution of ozon-problem. In order to be easily applicable by users of flons in the place where they are used, and prevent environmental pollution from occurring, the preferable method is simply to decompose flons by means of catalyst. Accordingly, the object of this invention is to provide the simple decomposing method by contacting flons with catalyst into harmless substances without hazard of destructing the ozon layer in using or after using flons before giving off into air.

Flons are hydrolyzed and decomposed to form hydrogen chloride, hydrogen fluoride and carbon dioxide gas, and can be collected all as harmless compounds by neutralizing hydrogen chloride and hydrogen fluoride. As the result of our researches to find a catalyst decomposing such flons, we, this inventors, have eventually found that the catalyst comprising alumina or alumina-silica complexed oxide, wherein the alumina containing amount is within a determined range, can decompose flons extremely effectively and can convert into harmless compounds against ozone destruction and have reached this invention.

SUMMARY OF THE INVENTION

That is to say, the present invention relates to the process for the catalytic decomposition of chlrofluoro-alkanes which comprises contacting chlrofluoro-alkanes with the catalyst comprising alumina or alumina-silica complexed oxide, wherein the range of Al/(Al+Si)atomic ratio is 1.0 to 0.5, in the presence of steam at the tempereture of 350° to 1,000° C.

DETAILED DESCRIPTION OF THE PREFERRED EMBODIMENTS

Figure 1:
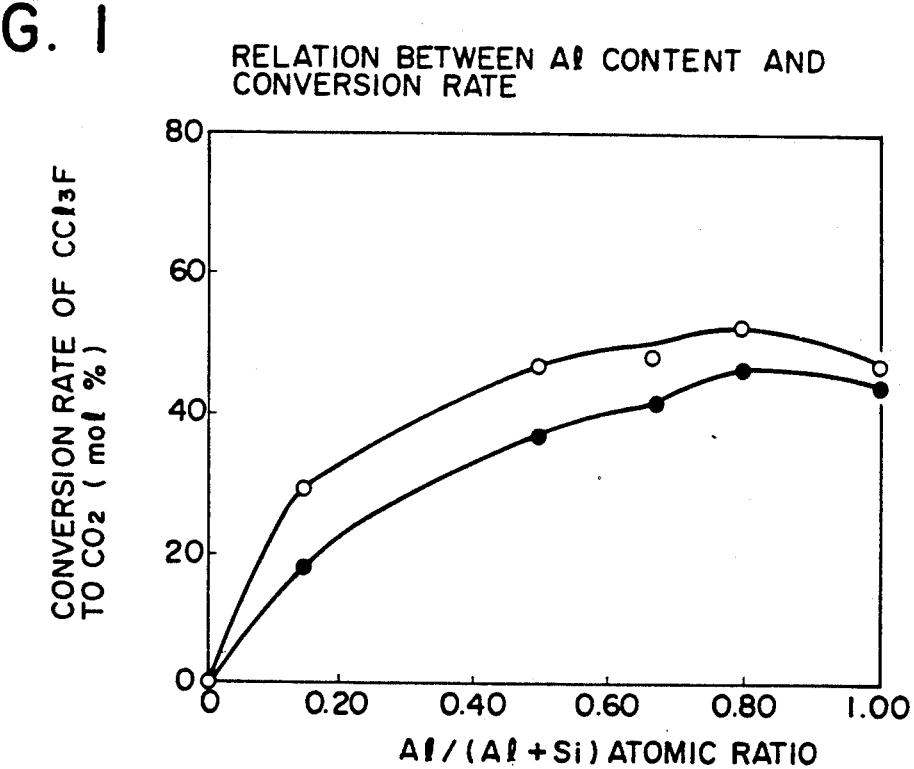
FIG. 1 is the graph showing the relation between the alumina content and conversion rate of flon-13 to $CO_2$ when flon-13 was decomposed.
○: Conversion rate after 15 minutes of reaction start,
●: Conversion rate after 1 hour of reaction start.

The application of the catalytic decomposition method of the invention is not particularly restricted by the kinds of flons. This method is applicable to any flons, wherein all or a part of the hydrogen in the hydrocarbon are substituted with at least one fluorine and at least one chlorine and is possibly applicable to all flons of methane series and ethane series and so on which are now abundantly produced.

For example, besides such chlorofluoro carbons (CFC), wherein all of the hydrogen in the hydrocarbon are substituted with fluorine and chlorine, and which are said to cause to destruct the ozone layer as
flon-11 (trichlorofluoromethane),
flon-12(dichlorodifluoromethane),
flon-13(chlorotrifluoromethane),
flon-112(tetrachlorodifluoromethane),
flon-113(trichlorotrifluoromethane),
flon-114(dichlorotetrafluoromethane),
flon-115(chloropentafluoromethane), etc,
such hydrochloro-fluorocarbons(HCFC) of the flons which are comparatively less fear of desctructing the ozone layer, as
flon-21(dichlorofluoromethane),
flon-22(chlorodifluoromethane),
flon-141(dichlorofluoroethane),
flon-142(chlorodifluoroethane),
flon-131(trichlorofluoroethane),
flon-132(dichlorodifuoroethane),
flon-133(chlorotrifluoroethane),
flon-121(tetrachlorofluoroethane),
flon-122(trichlorodifluoroethane),
flon-123(dichlorotrifluoroethane),
flon-124(chlorotetrafluoroethane) etc, are also possibly decomposed by method of this invention.

And also the method of this invention is similarly effective in the flons with 3 or more carbons.

On the other hand, such fluorohydrocarbon containing no chlorines as tetrafluoromethane (flon-14) can not almost decomposed by the method of this invention, but such fluorohydrocarbon is less dangerous against the destruction of the ozone layer. That is to say, this invention is effective for the decomposition of the flons which are considered to give rise to the most serious trouble against the destruction of the ozon layer.

The decomposition catalyst of the flons used in the present invention comprises alumina or alumina-silica complexed oxide with low content of silica. In other word, it contains alumina as a essentioal component and may contain silica under a determined content.

The alumina content in the above-described alumna-silica complexed oxide is within the range of Al/(Al+Si) atomic ratio of 1.0 to 0.5 and particularly effective range is 1.0 to 0.7. The higher is the ratio of silica, the more we can observe the tendency that the decomposition activity goes down gradually and the catalyst life becomes short.

Zeolites and mordenites are also Si, Al and Oxygen containing compounds, but Al content is less than 50 mol %, and so they are not satisfactory in the view point of the decomposition activity and catalyst life.

The alumina catalyst used in this invention can be obtained by hydrolyzing aluminium alkoxide such as aluminium isopropoxide, aluminium acid salts such as aluminium sulfate and aluminium nitrate, and aluminium alkali salts such as sodium aluminate and potassium aluminate to get gelatinous precipitate and calcinating at 350° to 1,000° C.

Alumina-silica complexed catalyst can be obtained as well by the use of the above-described aluminium compounds as alumina component, and silicates such as sodium silicate, potassium silicate and so on as silica component, by the so-called coprecipitation method, wherin these raw materials are hydrolyzed and coprecipitated, and by the so-called kneading method, wherein fine particle silica such as fumed silica and colloidal aluminium hydroxide were kneaded.

The flon decomposition catalyst of this invention can be manufactured then by calcining thus obtained alumina or alumina-silica colloidal precipitate at 350° to 1,000° C.

Calcining temparature is 350° to 900° C., preferably 450° to 900° C. Standard calcining time is about 3 hours, but it can be shorter or longer. Calcining over 900° C. shows the tendency of going down of the catalyst activety and calcining at 1,100° C. shows almost no activity.

Furthermore, lower limit of the calcining temperature is not necessarily restricted but the calcination over the temperature needed in the flon decomposition reaction is preferable for the stabilization of the catalyst.

The decomposition temperature range from 350° C. to 1,000° C. is adopted. The preferable decomposition temperature is different in the kinds of flons. Generally speaking, the higher the fluoridization degree, the higher temperature is necessary.

For example, flon-12 starts decomposition nearly at 350° C. and decomposes perfectly nearly at 500° C.

Of course, at the temperature under 500° C., enlarging the contact time with the catalyst can raise the decomposition rate.

On the other hand, flon-13, fluoridization of which is higher than that of flon-12, starts decomposition nearly at 450° C. and decomposes perfectly at the temperature over 600° C.

The decomposition temperature of flon-113 is between that of flon-12 and that of flon-13. Flon-113 starts the decomposition at about 400° C. and decomposes perfectly at about 600° C.

Accordingly, preferable decomposition temperature range is from 350° to 650° C., depending on the kinds of flons.

Setting the reaction temperature under 300° C., even in flon-11 of comparatively low stabilization, the decomposition rate is small.

On the other hand, raising the decomposition temperature decreases the surface area of alumina, over 1,000° C. the surface area becomes under 100 $m^2/g$ and the catalyst activity tends to be lower.

Catalyst can be used by the reaction form of either fixed or fluidized layer.

The decomposition reaction was carried out in the presence of steam, flons react with water to form HCl, HF, $CO_2$, CO etc and furthermore in case of flons with 2 or more carbons to form a little amount of such a compound as $CX_3COX$(X being fluorine or chlorine).

Mixing ratio of flons with water is not particularly restricted, but addition of steam more than stoichiometric water amount necessary for the decomposition of the flons to $CO_2$, HCl and HF is preferable.

In the reaction, the flons and only steam may be reacted, but the proper carrier gases can be also mixed. As the carrier gases, nitrogen, air and so on can be used.

As described above, there are acid compounds such as HCl, HF etc in the decomposition product. They can be absorbed and neutralized by alkali such as calcium dihydroxide, sodium hydroxide etc.

According to the present invention, the flons can be effectively decomposed to the harmless substances against ozone destruction by reacting the flons and steam in a simple apparatus.

Consequently, by giving off the exhausted gases from the factory using flons, and flon gases in used-off coolers or refrigerators through the apparatus packed with the catalyst of this invention, emission of the flons into air can be prevented. Therefore, this invention is effective for the prevention of environmental destruction.

EXAMPLES

This invention will be more clearly understood with reference to the following examples:

EXAMPLES 1~4, COMPARATIVE EXAMPLES 1~2

Aluminium isopropoxide was hydrolyzed for 2 hours at 95° C. to obtain gelatinous aluminium hydroxide precipitate. This precipitate was calcined at 600° C. in nitrogen atomosphere to prepare alumina catalyst.

Separately from this, a determined amount of silica (Made in Nippon Aerosil Inc., Brand name: Aerosil 200) was added with the above-mentioned gelatinous aluminium hydroxide precipitate, after kneading in a mortar, dried for 24 hours at 120° C., then was calcined for 3 hours at 600° C. to obtain the complexed alulmina-silica catalyst of different silica content.

Using the above-described alumina catalyst, the complexed alumina-silica catalyst and the silica (which was used in the preparation of the complexed alumina-silica catalyst) as catalyst respectively, mixing gases of flon-13 ($CClF_3$), steam and $N_2$ were introduced through a flow-reactor having the catalyst layer packed with the above-described catalyst, were decomposition reacted and the conversion rate to $CO_2$ after 15 minutes of the reaction start and after 1 hour of the reaction start were measured. The reaction condition is as follows.

(1) Reaction temperature 570° C.
(2) Catalyst contacting time (Total catalyst amount/flon gas flow rate $W/F = 37.3$ g.hr/mol.

(3) Gas partial pressure
Flon: 0.06 atm
$H_2O$: 0.44 atm
$N_2$: 0.50 atm.

The kinds of the catalysts and the results are shown in Table 1. From the result of Table 1, the relation between the alumina content in the the catalyst and the conversion rate are shown in FIG. 1. (○ mark: 15 minutes after reaction start, ● mark: 1 hour after reaction start.)

Alumina or alumina-silica complexed oxide catalyst of this invention, wherein the range of Al/(Al+Si) atomic ratio is 1.0 to 0.5, shows high initial conversion rate (after 15 minutes) and high conversion rate after 1 hour respectively, particularly the catalyst, wherein the range of the above-described atomic ratio is 1.0 to 0.7, shows the highest conversion rate, but the catalyst, wherein the range of the atomic ratio is under 0.5 shows the tendency that the conversion rate goes down rapidly.

TABLE 1

The decomposition rate of $CClF_3$ (flon-13)

| Catalysts | | Conversion rate to $CO_2$ (mol %) | |
|---|---|---|---|
| | | After 15 minutes | After 60 minutes |
| Example 1 | $Al_2O_3$ | 45.4 | 43.5 |
| Example 2 | $SiO_2$—$Al_2O_3$ $Al/(Al + Si) = 0.8$ | 51.8 | 46.1 |
| Example 3 | $SiO_2$—$Al_2O_3$ $Al/(Al + Si) = 0.67$ | 46.6 | 40.6 |
| Example 4 | $SiO_2$—$Al_2O_3$ $Al/(Al + Si) = 0.50$ | 46.2 | 35.9 |
| Comparative Example 1 | $SiO_2$—$Al_2O_3$ $Al/(Al + Si) = 0.15$ | 28.4 | 17.4 |
| Comparative Example 2 | $SiO_2$ | 0 | 0 |

COMPARATIVE EXAMPLE 3~6

In place of the catalyst of Example 1, using mordenite and zeolite as catalyst, the decomposition reaction of flon-13 ($CClF_3$) was carried out by the same method as Example 1.

The kinds of the catalysts and the results are shown in Table 2. The catalysts of alumina and low silica content alumina-silica complexed oxide of this invention show higher flon decomposition activity than that of the high silica content silica-alumina compounds such as mordenite and zeolite.

TABLE 2

Decomposition rate of $CClF_3$ (flon-13)

| Catalysts | | Conversion rate to $CO_2$ (mol %) | |
|---|---|---|---|
| | | After 15 minutes | After 60 minutes |
| Comparative Example 3 | Proton displaced mordenite *1 | 13.6 | 5.9 |
| Comparaive Example 4 | Sodium displaced mordenite *2 | 1.1 | 0 |
| Comparative Example 5 | Proton displaced Y type zeolite *3 | 8.1 | 4.7 |
| Comparative Example 6 | Sodium displaced Y type zeolite *4 | 1.8 | 1.1 |

*1 Made in Toso Inc. TSZ-640H0A
*2 The above described proton type mordenite is ion-exchanged in 5% NaCl solution
*3 Made in Toso Inc. TSZ-320H0A
*4 Made in Shokubai-Kasei Inc. ZCP50(Na-Y)

EXAMPLE 5

Aluminium isopropoxide was hydrolyzed to obtain gelatinous precipitation of aluminium hydroxide.

Varying the calcination temperature of this precipitate, aluminas having various surface area were prepared.

Using these aluminas as catalysts, similarly as in Example 1, the decomposition test of flon-13 was carried out and the conversion rate after 15 minutes of the reaction start was measured.

The decomposition condition was as follows.

(1) Reaction temperature 570° C.
(2) Catalyst contacting time (total catalyst amount/flon gas flow rate)

$W/F = 37.3$ g.hr/mol.

(3) Gas partial pressure
Flon: 0.06 atm
$H_2O$: 0.44 atm
$N_2$: 0.50 atm.

Figure 2:
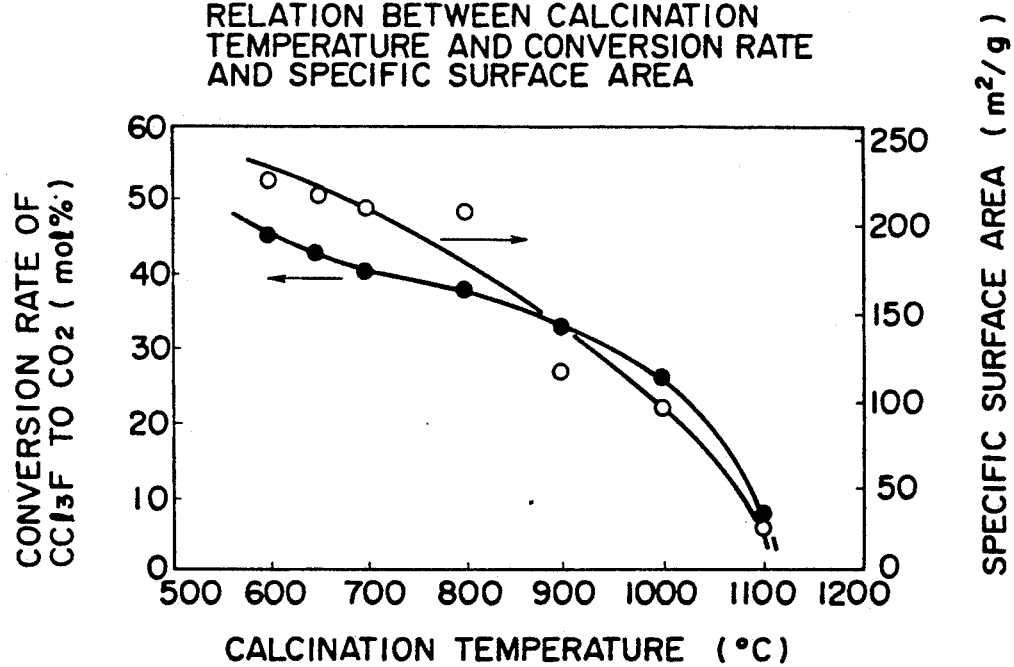
FIG. 2 is the graph showing the relation between the calcination temperature of the catalyst and conversion rate of flon-13 to $CO_2$ (○), and also between the calcination tempereture and specific surface area of the catalyst (●) when flon-13 was decomposed by the method of the present invention.

The result is shown in FIG. 2.

The catalyst calcined at the temperature over 1,000° C. shows low decomposition rate (conversion rate) of the flons.

EXAMPLE 6

Figure 3:
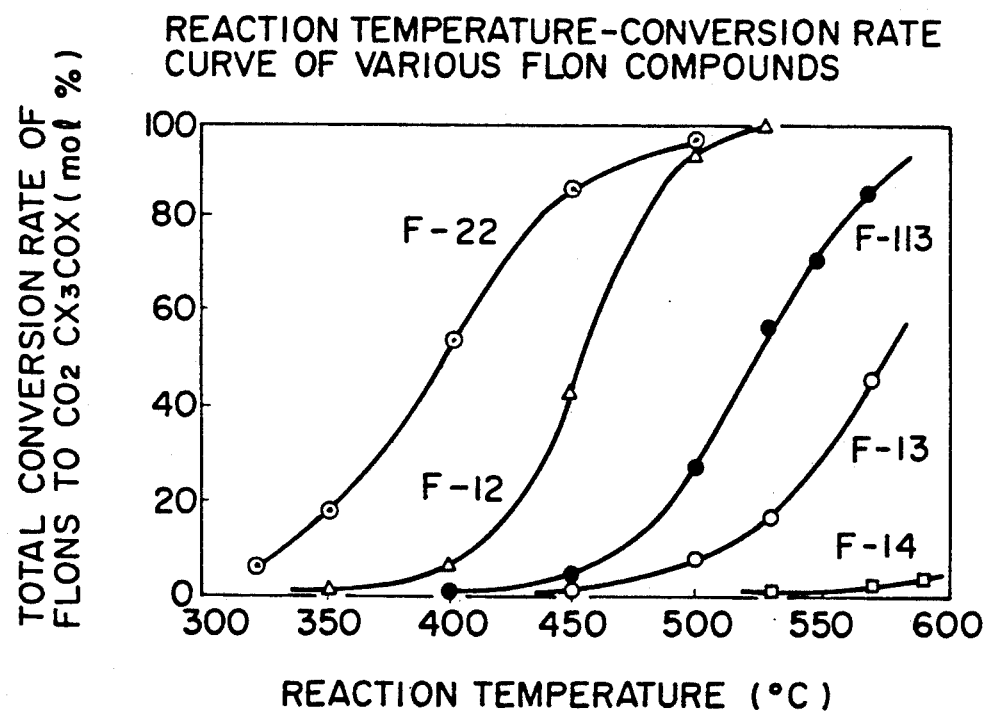
FIG. 3 is the graph showing the relation between the reaction temperature and conversion rate of flon-13 to $CO_2$ and $CX_3COX$.

Using the same catalyst as in Example 5 prepared at the calcining temperature of 600° C., by the same method as Example 5, the decomposition test of the various flons were carried out, and the total conversion rate to $CO_2$ and $CH_3COX$ after 15 minutes of reaction start was tested. The result is shown in FIG. 3.

The decomposition start temperature of flon-12, flon-22 and so on were about 300° to 350° C., and the decomposition rate reached about 100% at the temperature over 500° C. The decomposition start temperature of flon-113 was nearly 400° to 450° C. and the decomposition rate is estimated to reach about 100% at nearly 600° C.

On the other hand, flon-14 of fluorocarbon, which contains no chlorine and has less fear of destructing the ozone layer is scarcely decomposed.

EXAMPLE 7

Using air as carrier, on the same condition as Example 6 except setting the gas partial pressure to the following, the decomposition test of flon-12 and flon-13 were carried out.

Flon: 0.06 atm
$H_2O$: 0.44 atm

Air: 0.50 atm.

Figure 4:
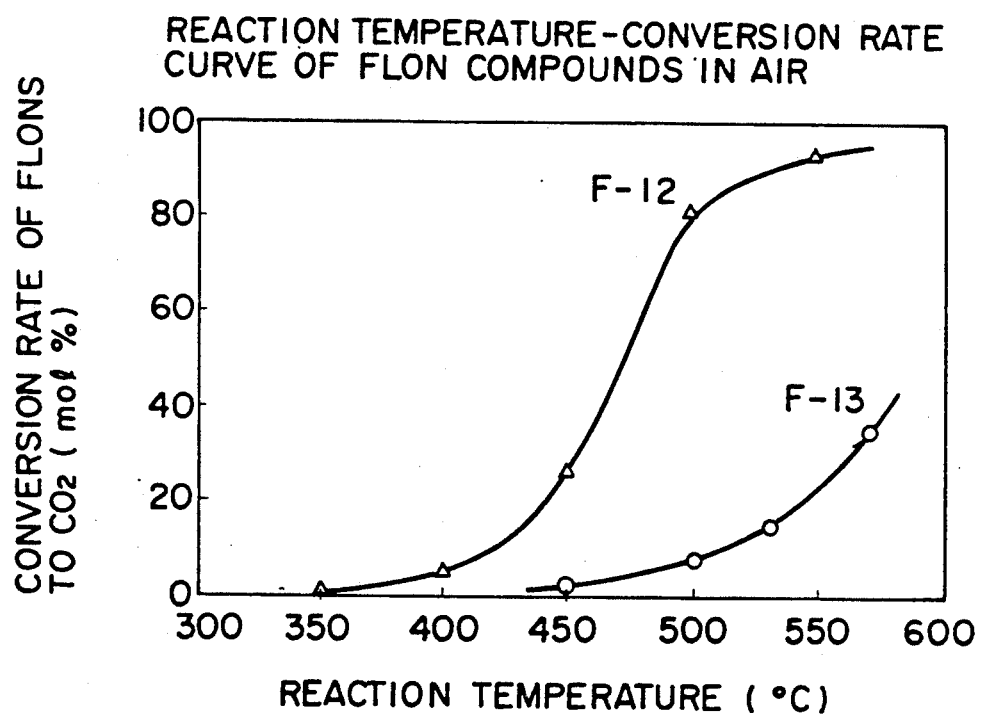
FIG. 4 is the graph showing the relation between the reaction temperature and the conversion rate of flon-12 and flon-13 to $CO_2$ when air is used as carrier.

The result are shown in FIG. 4.

We claim:

1. A process for the catalytic decomposition of chlorofluoro-alkanes, which comprises reacting chlorofluoro-alkanes with steam in at least the stoichiometric amount necessary for the decomposition of the chlorofluoro-alkanes to $CO_2$, HCl and HF in the presence of a catalyst, which catalyst is an alumina-silica complex, wherein the range of Al/(Al+Si) atomic ratio is less than 1.0, said catalyst having a surface area of at least 100 $m^2/g$, at the temperature of 350° C. to 650° C.

2. A process according to claim 1, wherein said chlorofluoro-alkanes are chlorofluorocarbons, wherein all of the hydrogens in hydrocarbons are substituted with at least one fluorine and at least one chlorine.

3. A process according to claim 2, wherein said chlorofluorocarbons are chlorofluoromethanes or chlorofluoroethanes.

* * * * *